United States Patent
Kawagoshi

(10) Patent No.: US 7,466,187 B2
(45) Date of Patent: Dec. 16, 2008

(54) BOOSTER CIRCUIT

(75) Inventor: Hirokazu Kawagoshi, Ohtsu (JP)

(73) Assignee: NEC Electronics Corporation, Kanagawa (JP)

( * ) Notice: Subject to any disclaimer, the term of this patent is extended or adjusted under 35 U.S.C. 154(b) by 57 days.

(21) Appl. No.: 11/529,303

(22) Filed: Sep. 29, 2006

(65) Prior Publication Data
US 2007/0075765 A1    Apr. 5, 2007

(30) Foreign Application Priority Data
Sep. 30, 2005    (JP) ............................... 2005-285967

(51) Int. Cl.
*H02M 3/18* (2006.01)
*G05F 3/16* (2006.01)
(52) U.S. Cl. .................. 327/536; 327/537; 363/60
(58) Field of Classification Search .................... None
See application file for complete search history.

(56) References Cited

U.S. PATENT DOCUMENTS

| | | | | |
|---|---|---|---|---|
| 4,802,739 A | * | 2/1989 | Iwamoto | 345/87 |
| 5,790,393 A | * | 8/1998 | Fotouhi | 363/60 |
| 6,597,156 B2 | * | 7/2003 | Gogolla | 323/224 |
| 7,088,356 B2 | * | 8/2006 | Nishimura | 345/211 |
| 2007/0279950 A1 | * | 12/2007 | Sugiyama et al. | 363/59 |

FOREIGN PATENT DOCUMENTS

JP    2005-45934    2/2005

* cited by examiner

*Primary Examiner*—Lincoln Donovan
*Assistant Examiner*—Terry L Englund
(74) *Attorney, Agent, or Firm*—Young & Thompson

(57) ABSTRACT

A booster circuit for boosting and outputting a voltage between a power supply potential line and a reference potential line using a capacitor connected between a boosted voltage output node and the reference potential line that includes a first switch for separating the capacitor from the boosted voltage output node while a boosting operation is suspended, a second switch connected in parallel to the capacitor and being conductive while the boosting operation is suspended, and an electric path between the power supply potential line and the boosted voltage output node while the boosting operation is suspended.

10 Claims, 2 Drawing Sheets

BOOSTER CIRCUIT

INCORPORATION BY REFERENCE

The disclosure of U.S. Pat. No. 7,084,697 including the specification, drawings and abstract is incorporated herein by reference in its entirety.

BACKGROUND OF THE INVENTION

1. Field of the Invention

The present invention relates to a booster circuit for generating a higher voltage than a power supply voltage, and particularly to a charge pump style booster circuit.

2. Description of Related Art

A display unit of a portable information device such as cellular phone and Personal Digital Assistant (PDA) is configured to operate at a low power supply voltage to save power consumption. On the other hand, a display panel for displaying processed information sometimes requires a higher voltage than a power supply voltage. Generally a circuit for driving a display panel is provided with a booster circuit for boosting a power supply to generate a necessary driving voltage.

An example of booster circuit is disclosed in Japanese Unexamined Patent Application Publication No. 2005-45934. The booster circuit is a charge pump style as shown in FIG. 3 that includes P-channel MOS transistors M1, M3 to M8, an N-channel MOS transistor M2, capacitors C1 and C2. The booster circuit is configured as shown in FIG. 3 and boosts a power supply voltage VDD by twice in response to a clock signal CLK to generate the voltage as Vout.

The circuit in FIG. 3 includes a P-channel MOS transistor M9 between a power supply line VDD and the capacitor C2 (i.e. Vout line) in order to speed up start-up at power-on.

A booster circuit needs to be operated to display information, however it is not necessary to display information at any time. Operating a booster circuit at all the time only consumes unnecessary power. Thus a boosting operation of a booster circuit is suspended while there is no information to be displayed. The circuit shown in FIG. 3 fixes a clock CLK to high-level, turns on the transistors M1 and M2, turns off the transistor M3 and M4 to charge the capacitor C1 while a boosting operation is suspended. Further, the circuit fixes a control signal CNT supplied to agate of the transistor M9 to low-level and electrically connects the VDD line and the Vout line, so that the capacitor C2 is charged to a level of VDD. Charging the capacitor C2 speeds up start-up when resuming a boosting operation.

However in recent years, there are increasing requests from clients to generate a ground level potential as Vout while a boosting operation is suspended, so as to ensure that an operation of a circuit receiving Vout is stopped while a boosting operation is suspended. Setting Vout to a ground level while a boosting operation is suspended causes a signal necessary to operate a booster circuit such as a clock signal CLK to be the ground level, thereby not ensuring to stop a boosting operation. This is because that the signal such as the clock signal CLK requires twice the VDD level during a boosting operation and is generated by a circuit operated on Vout voltage.

SUMMARY OF THE INVENTION

According to an aspect of the present invention, there is provided a booster circuit for boosting and outputting a voltage between a power supply potential line and a reference potential line using a capacitor connected between a boosted voltage output node and the reference potential line that includes a first switch for separating the capacitor from the boosted voltage output node while a boosting operation is suspended, a second switch connected in, parallel to the capacitor and being conductive while the boosting operation is suspended, and an electric path between the power supply potential line and the boosted voltage output node while the boosting operation is suspended.

With the booster circuit of the present invention, the capacitor is discharged to be a reference potential by the second switch while the boosting operation is suspended. The boosted voltage output node is electrically separated from the capacitor and also supplied with a voltage from the power supply potential line. This ensures that the boosting operation is suspended.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
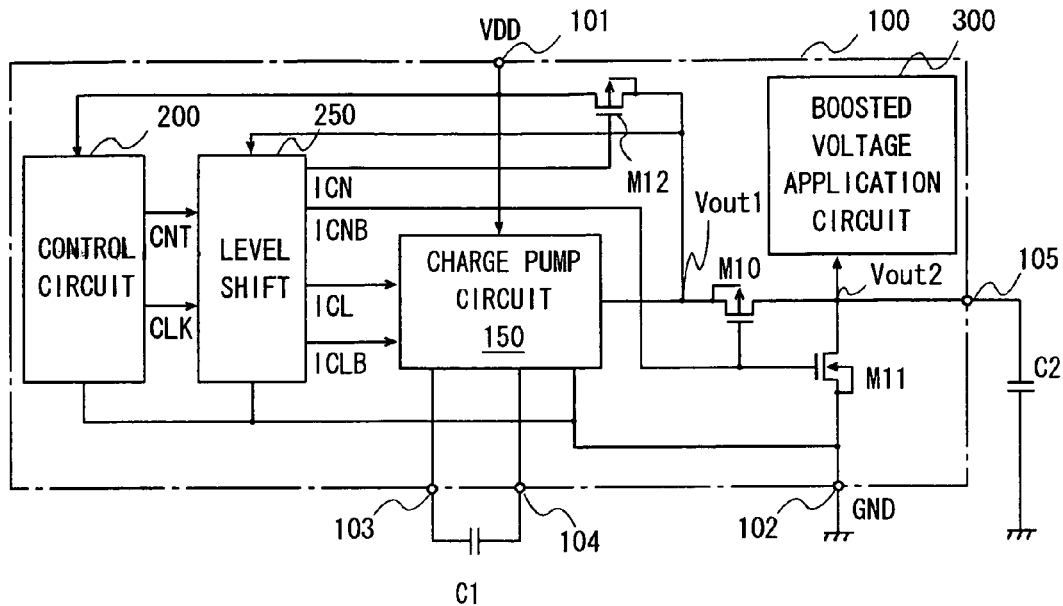
FIG. 1 is a circuit diagram according to a first embodiment of the present invention.
Figure 3:
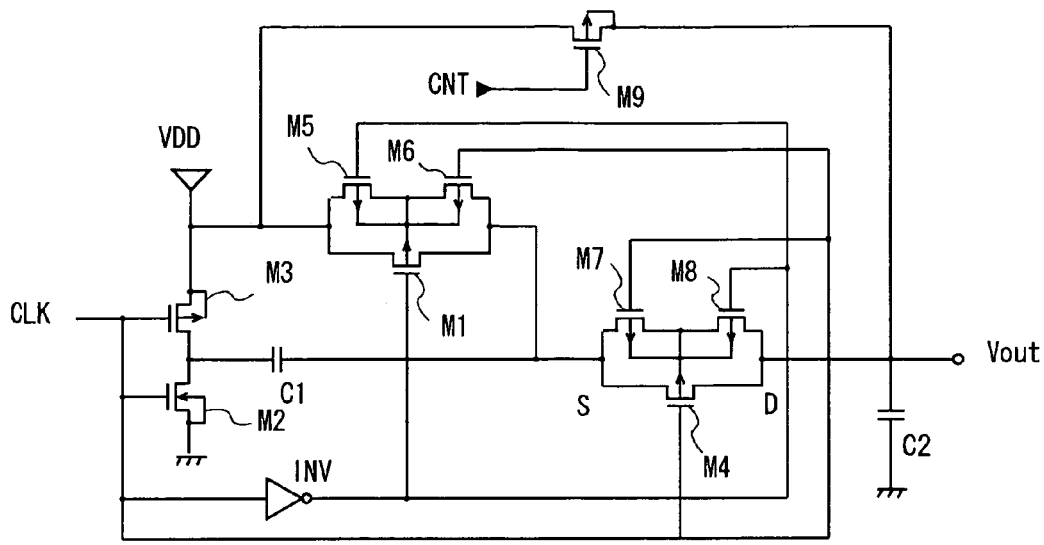
FIG. 3 is a circuit diagram according to a conventional technique.

An embodiment of the present invention is described hereinafter in detail with reference to the drawings. FIG. 1 is a view showing a booster circuit according to a first embodiment of the present invention. The booster circuit is included with other functional blocks in a semiconductor integrated circuit (hereinafter referred to as an IC chip). Capacitors C1 and C2 are connected as external components to the IC chip 100. Thus the chip 100 includes connection terminals (connection pins) 103 and 104 for the capacitor C1, and a connection terminal 105 for the capacitor C2. A charge pump circuit 150 comprising the booster circuit includes transistors M1 to M8 as shown in FIG. 3.

The IC chip 100 further includes a VDD terminal 101 as a power supply potential and a ground (GND) terminal 102 as a reference potential. A power supply potential line from the VDD terminal 101 is connected to the charge pump circuit 150, a control circuit 200, and an output end of boosted voltage, which is a Vout1, via a P-channel MOS transistor M12. The node Vout1 is connected to a level shift circuit 250 (a first boosted voltage application circuit). Further, the node Vout1 is connected to a capacitor C2 connection terminal 105 via a P-channel MOS transistor M10. The terminal 105 (output node Vout2) is connected to the boosting voltage circuit 300, (a second boosted voltage application circuit). Further, the node Vout2 is connected to a GND terminal 102 via an N-channel transistor M11. The transistor M11 is connected in parallel to the capacitor C2.

The control circuit 200 generates a clock signal CLK necessary for a boosting operation and also a control signal CNT for activating and deactivating a boosting operation. These signals CLK and CNT are level shifted by the level shift circuit 250 to boosting clock signals ICL and ICLB having complementary phases, and to boosting operation control signals ICN and ICNB having complementary phases. The signal ICN is supplied to a gate of the transistor M12, and the signal ICNB is supplied to gates of the transistors M10 and M11.

When the IC chip power is turned on, the boosting voltage output node Vout1 and the capacitor C2 are charged along with an increase in a potential of the terminal VDD due to the power-on via the transistors M10 and M12 because the circuit nodes in the IC chip 100 has no charge at all. On the other hand the control circuit 200 is activated by the power supply voltage VDD. Thus if the IC chip 100 requires a boosted voltage, the control circuit 200 starts generating a clock signal CLK together with making a control signal CNT be a level activating a boosting operation (for example high-level). This fixes a signal ICNB to be low-level, while a signal ICN to be high level along with an increase in the power supply voltage VDD. At this time, a back gate of the transistor M12 is connected to M10 side, creating parasitic effect. The parasitic effect continues to charge the node Vout1 and the capacitor C2.

With an increase in a power supply voltage level supplied to the level shift circuit, the clock signals ICL and ICLB are raised to a level necessary to operate the charge pump circuit 150. Then the charge pump circuit starts a voltage boosting operation using the capacitors C1 and C2.

The charge pump circuit 150 having a configuration shown in FIG. 3 boosts the nodes Vout1 and Vout2 to a level twice as high as the power supply voltage VDD (which is 2×VDD).

This voltage is supplied from the node Vout2 to the boosted voltage application circuit 300, for a display panel requiring a level higher than the power supply voltage VDD to be operated, for example.

If a display panel does not need to be operated, the control circuit 200 changes the control signal CNT to a level deactivating a boosting operation (for example low-level). Further, generation of a clock signal CLK is stopped. However if the clock signal CLK is used in other circuits not shown, the clock signal CLK is continued to be generated. The signal ICN is inverted to low-level and the signal ICNB is inverted to high-level. Further, the level shift circuit 250 is configured in a way that the boosting clock signal ICL and ICLB are fixed to high and low levels respectively by the control signal CNT using an NAND gate, for example.

A high-level signal ICNB turns off the transistor M10 and turns on the transistor M11. Consequently the capacitor C2 is discharged and a potential of the output node Vout2 is pulled down to ground level, which is low-level. On the other hand a low-level signal ICN turns on the transistor M12, thereby enabling the output node Vout1 to stay at a VDD level even while a boosting operation is suspended.

While a potential of the terminal 105 is pulled down to low level while a boosting operation is suspended, the power supply voltage VDD is supplied to the level shift circuit 250, a first boosted voltage application circuit. This accordingly satisfies the requests from clients and also a voltage necessary to activate a boosting operation is supplied to the level shift circuit 250, a first boosted voltage application circuit. Therefore, the level shift circuit 250 needs not to be changed to ensure fixing a voltage in the charge pump circuit 150 to a state the boosting operation is suspended by a signal from the level shift circuit 250.

Second Embodiment

Figure 2:
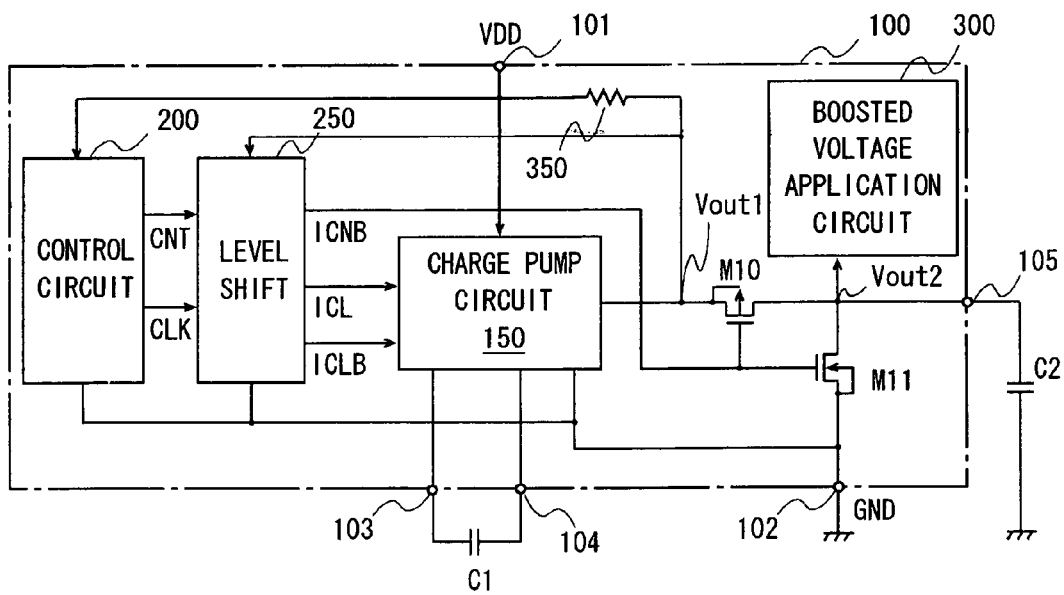
FIG. 2 is a circuit diagram according to a second embodiment of the present invention.

FIG. 2 is a view showing a second embodiment of the present invention. In FIG. 2, components identical to those in FIG. 1 are denoted by reference numerals identical to those therein with explanation omitted. In this embodiment, a resistance 350 is provided instead of the transistor M12 in FIG. 1.

There are possibilities that following issue could arise from using the transistor M12 in FIG. 1. The issue is explained hereinafter in detail. In the circuit of FIG. 1, the terminal 105 becomes low-level while a boosting operation is suspended. Each time a boosting operation is activated, the power supply voltage VDD is charged to the capacitor C2 having 0V through the transistor M12.

If the IC chip is formed on a P type semiconductor substrate, the transistor M12 includes PNP parasitic transistor for the P type semiconductor substrate. If the parasitic transistor is turned on, an NPN parasitic transistor included in the same semiconductor substrate is turned on, resulting both parasitic transistors in a thyristor operation.

Figure 4:
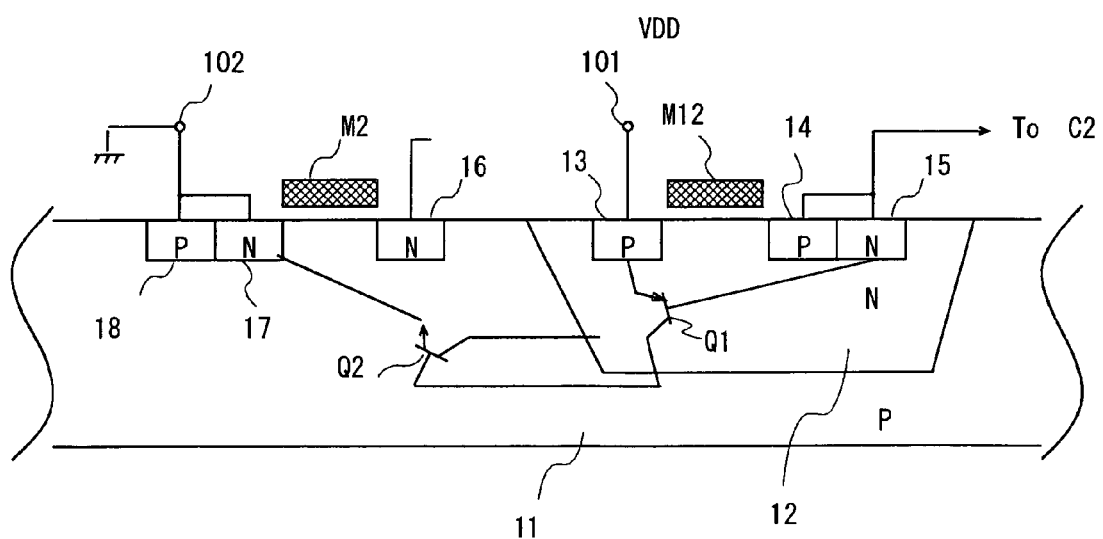
FIG. 4 is a cross-sectional diagram showing substantial part of a semiconductor integrated circuit for explaining a latch up in the circuit of FIG. 1.

FIG. 4 is a cross-sectional structure of the transistors M12 and M2 formed on a P type semiconductor substrate. In FIG. 4, 11 indicates a P type semiconductor substrate having an N well 12 formed therein. Drains and sources of P type regions 13 and 14, and a back gate contact of an N type region 15 are formed in the N well 12 to configure the transistor M12. Further, drains and sources of N type regions 16 and 17, and a back gate contact of a P type region 18 are formed in the P type semiconductor substrate 11 to form the transistor M2. The P type region 13 of the transistor M12 is connected to a VDD terminal 101, and the P type region 14 and the N type region 15 are connected to the capacitor C2. The N type region 17 and the P type region 18 of the transistor M2 are connected to the GND terminal 102.

Each time a boosting operation is activated, the power supply voltage VDD is charged to the capacitor C2 having 0V, and a forward current flows from the P type region 13 of the transistor M12 to the N well 12. This causes a parasitic PNP transistor Q1 comprised of the P type region 13, the N well 12, and the P type semiconductor substrate 11 to be turned on, and a potential of the P type semiconductor substrate 11 to rise towards VDD. The rise in the potential could turn on a parasitic NPN transistor Q2 formed by the N well 12, P type semiconductor substrate 11, and N region 17. If the parasitic transistors Q1 and Q2 are turned on, a thyristor operation by the parasitic transistors Q1 and Q2 could generate a latch-up, causing a large current to flow between the VDD terminal 101 and the GND terminal 102. Therefore, a boosting operation may not properly be activated in the booster circuit.

To properly activate the boosting operation in the booster circuit, a Schottky diode with a smaller Vf than a PN junction forward voltage Vf by the P type region 13 and the N well 12 must be connected between the VDD terminal 101 and the terminal 105, so that the parasitic transistor Q1 will not be turned on. Connecting a Schottky diode introduces other problems such as an increase in the number of external components and the size of an area where components are mounted.

On the other hand the resistance 350 is used in the circuit of FIG. 2, thereby capable of preventing a latch-up when activating the boosting operation even without a Schottky diode connected between the VDD terminal 101 and the terminal

105. By using the resistance 350, VDD potential difference is generated in both ends of the resistance 350 when a boosting operation is activated, thereby generating a current in the resistance 350. However by specifying a resistance value of the resistance 350 to an appropriate range, a level of the current can be acceptable in comparison to an operating current in the booster circuit including load.

In the first and the second embodiment, only the level shift circuit 250 is provided as a first booster voltage application circuit to be connected to the output node Vout1. However other circuit activated at a VDD level while a boosting operation is deactivated may be connected if necessary.

It is apparent that the present invention is not limited to the above embodiment and it may be modified and changed without departing from the scope and spirit of the invention.

What is claimed is:

1. A booster circuit for boosting a voltage between a power supply potential and a ground potential using a capacitor connected between a boosted voltage output node and the ground potential, the booster circuit comprising:
    a first switch for separating the capacitor from the boosted voltage output node while a boosting operation is suspended;
    a second switch connected to the ground potential in parallel to the capacitor and being conductive while the boosting operation is suspended; and
    an electric path between the power supply potential and the boosted voltage output node while the boosting operation is suspended.

2. The booster circuit according to claim 1, wherein the electric path comprises a transistor.

3. The booster circuit according to claim 1, wherein the electric path comprises a resistance.

4. The booster circuit according to claim 1, further comprising a first boosted voltage application circuit formed by a semiconductor integrated circuit and activated by a potential of the boosted voltage output node while the boosting operation is suspended.

5. The booster circuit according to claim 4, wherein the boosting operation is performed by a charge pump circuit.

6. The booster circuit according to claim 5, further comprising a circuit as the first boosted voltage application circuit for outputting a signal to fix the charge pump circuit to a predetermined state while the boosting operation is suspended.

7. The booster circuit according to claim 4, further comprising a second boosted voltage application circuit connected to the capacitor.

8. The booster circuit according to claim 1, further comprising:
    a first circuit for generating a signal necessary to activate the boosting operation, the first circuit being connected to the boosted voltage output node while the boosting operation is suspended; and
    a second circuit for receiving a boosted voltage generated in the capacitor, the second circuit being electrically separated from the boosted voltage output node while the boosting operation is suspended.

9. The booster circuit according to claim 8, wherein the first circuit generates a boosting clock signal.

10. A booster circuit comprising:
    a first switch connected between first and second boosted voltage output nodes and separating the first boosted voltage output node from the second boosted voltage output node while a boosting operation is suspended;
    a second switch connected between the second boosted voltage output node and a reference potential and being conductive while the boosting operation is suspended so that a potential of the second boosted voltage output node is the reference potential; and
    an electric path between a power supply potential and the first boosted voltage output node to maintain a power supply potential at the first boosted voltage output node while the boosting operation is suspended.

* * * * *